United States Patent [19]

Hishiki et al.

[11] 4,010,535

[45] Mar. 8, 1977

[54] METHOD OF FABRICATING A VOLTAGE MULTIPLIER CIRCUIT ASSEMBLY

[75] Inventors: Hideo Hishiki; Shiyousaku Yamaguchi; Akihisa Miyazaki, all of Yokohama, Japan

[73] Assignee: Victor Company of Japan, Limited, Japan

[22] Filed: Oct. 29, 1974

[21] Appl. No.: 519,052

[30] Foreign Application Priority Data

Oct. 31, 1973  Japan ............................. 48-122605
Dec. 25, 1973  Japan ....................... 48-147254[U]

[52] U.S. Cl. .................................. 29/577; 29/738; 29/760; 29/588; 29/628; 307/110; 307/321; 357/76

[51] Int. Cl.² ....................................... H05K 13/00

[58] Field of Search ............ 29/577, 588, 589, 624, 29/626, 627, 628, 203 L, 203 J, 203 P; 357/72, 75, 76, 77; 307/320, 321, 109, 110; 321/8, 11, 15, 27 R; 174/52 PE; 317/101 C, 101 CB, 101 CP, 101 CW, 101 DH, 231, 103, 120, 230, 261, 233; 264/272

[56] References Cited

UNITED STATES PATENTS

| | | |
|---|---|---|
| 3,512,255 | 5/1970 | Hayden et al. .......... 317/101 CW X |
| 3,568,036 | 3/1971 | Rosenberg ..................... 357/72 X |
| 3,589,003 | 6/1971 | Kastner .............................. 321/15 |
| 3,701,002 | 10/1972 | Toba .................................. 321/15 |
| 3,708,876 | 1/1973 | Klehm ..................... 317/101 CC X |
| 3,748,538 | 6/1973 | Shekervian et al. ....... 174/52 PE X |
| 3,749,601 | 7/1973 | Tittle ......................... 174/52 PE X |
| 3,772,079 | 11/1973 | Louzon ...................... 174/52 PE X |
| 3,777,249 | 12/1973 | Dumas ............................. 321/15 X |
| 3,849,791 | 11/1974 | Nakashima ..................... 321/15 X |

*Primary Examiner*—Carl E. Hall
*Attorney, Agent, or Firm*—Robert E. Burns; Emmanuel J. Lobato; Bruce L. Adams

[57] ABSTRACT

A voltage multiplier circuit assembly circuit is fabricated by the use of an apparatus which comprises a pair of guide walls juxtaposed on a horizontal insulative support, each of the guide walls having first and second slits in opposed relation to the corresponding slits in the other. The guide walls define a first and a second area and an intermediate area therebetween. Condensers of the wafer type is placed alternately on the first and second areas with one of their electrodes facing downward. Diodes having a pair of connecting leads are placed on the intermediate area alternately with the condensers and alternately through the first and second opposed slits. Conductive cementing agent is applied between the contact points of the condensers and diodes.

11 Claims, 11 Drawing Figures

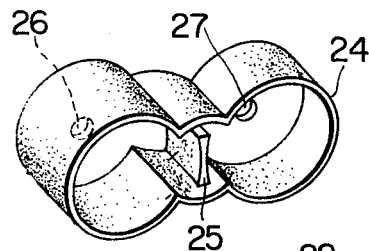
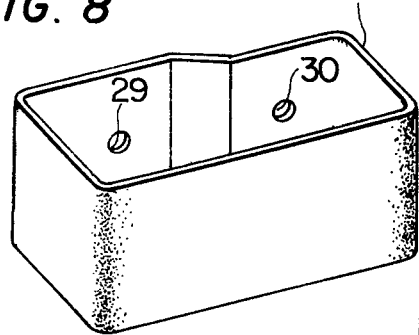
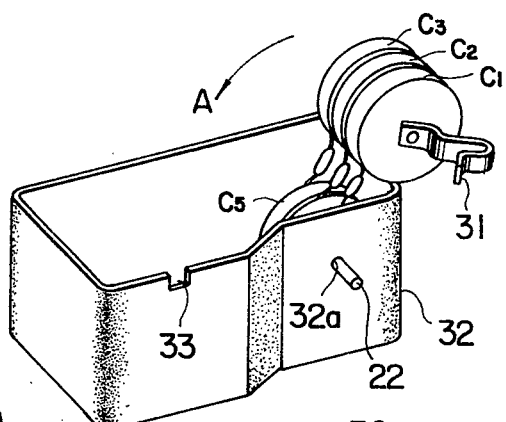
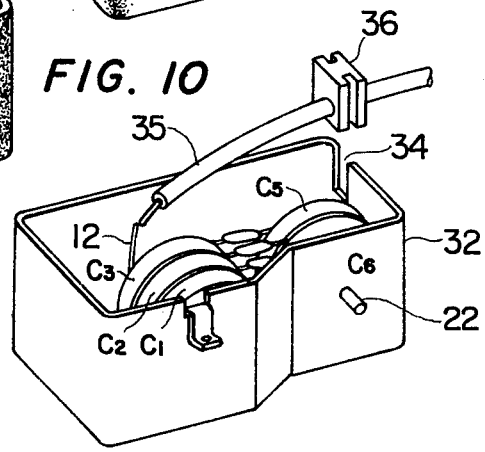
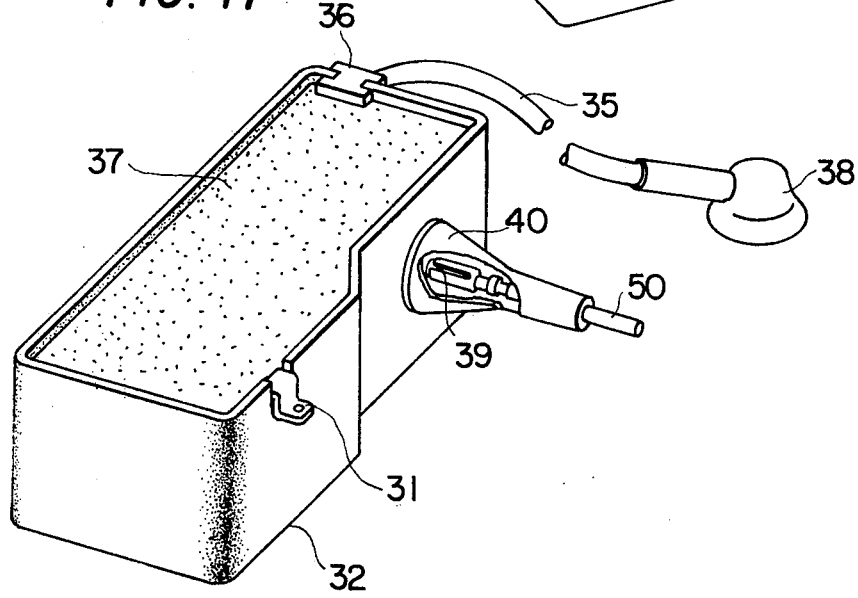

METHOD OF FABRICATING A VOLTAGE MULTIPLIER CIRCUIT ASSEMBLY

The present invention relates to a method of fabricating a Cockcroft circuit or voltage multiplier circuit assembly primarily used for a high-tension voltage circuit of a television receiver.

The object of the invention is to provide a method of fabricating a Cockcroft circuit which is minimized in overall size.

Another object of the invention is to provide an improved method which minimizes effort in the production process.

A further object of the invention is to provide an apparatus to facilitate the fabrication of a Cockcroft circuit.

The voltage multiplier circuit assembly is generally known in the art and used in applications where high voltage is desired such as in television receivers. The voltage multiplier circuit assembly comprises first and second groups of series-connected condensers and a plurality of diodes connected in series with each other in the direction of a current flow and further connected to the condensers such that the condensers of the first group are electrically connected in staggered relation to the condensers of the second group through the diodes. Alternating voltage when applied to the input terminals of the assembly will cause a charge to be transported through the rectifiers at each half cycle and passed stepwise up through the groups of condensers to the output terminals.

In accordance with one aspect of the invention, each of the condensers are alternately placed on a first and a second area, and each of the rectifiers or diodes is placed alternately with the condensers on a third and a fourth area with their connecting leads extending into the first and second areas, the third and fourth areas being disposed adjacent the first and second areas. Conductive cementing agent is applied to contact points between the condensers and diodes to thereby form a voltage multiplier circuit assembly in which the condensers are connected in series to each other and piled up one upon another in two groups or stacks and the diodes are connected in series with each other and further connected to the condensers such that the condensers of one group are electrically connected in staggered relation to the condensers of the other group via the diodes.

In another aspect of the invention, there is provided an apparatus for fabricating the voltage multiplier circuit assembly in one block, which apparatus comprises a pair of guide walls defining the first and second areas as referred to above and an intermediate area in which the third and fourth areas lie in proximity to the first and second areas. Each of the guide walls is provided with a first and a second slit in opposed relation to the corresponding slits in the other. The condensers are stacked on the first and second areas alternately and the diodes are placed in the intermediate area in alternate fashion by passing their connecting leads through the first and second opposed slits.

The invention will be described further in conjunction with the accompanying drawings, in which:

FIG. 7 is a perspective view of an insulative housing in which the voltage multiplier circuit assembly of FIG. 5 will be inserted;

FIG. 8 is a perspective view of another insulative housing in which the housing of FIG. 7 with the voltage multiplier circuit assembly of FIG. 5 being inserted will be accommodated;

FIG. 9 is a perspective view showing the voltage multiplier circuit assembly of FIG. 5 being inserted into a housing in which moulding material will be poured;

FIG. 10 is a perspective view showing the voltage multiplier circuit assembly being placed in position with insulated connecting lead for connection to one terminal of the voltage multiplier circuit assembly; and FIG. 11 is a perspective view of the FIG. 10 arrangement showing the voltage multiplier circuit assembly being embedded in a plastic mould and external connections being made.

Figure 1:
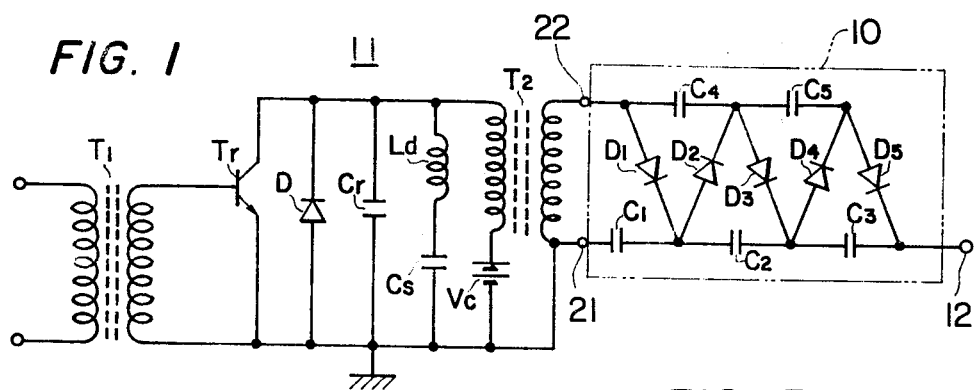
FIG. 1 is a circuit diagram of a voltage multiplier circuit assembly coupled to a high-tension circuit of a television receiver.

Reference is now made FIG. 1 where there is shown a Cockcroft circuit voltage multiplier assembly 10 coupled to the output of a high-tension voltage circuit 11 of a television receiver. The high-tension voltage circuit 11 comprises a transformer $T_1$ having its primary coupled to the horizontal sweep voltage generator (not shown) and its secondary to a transistor $T_r$ whose collector and emitter electrodes are supplied with a potential from a d.c. power source $V_c$ through a primary of an output or flyback transformer $T_2$. A horizontal deflection coil Ld is coupled to the collector of transistor $T_r$ in series with a capacitor $C_s$. A capacitor Cr is also coupled to transistor $T_r$ in parallel with a damping diode D to provide resonance at the frequency of the horizontal sweep frequency. One stack comprising capacitors $C_1$, $C_2$ and $C_3$ is at a steady potential (except for ripple) with one terminal 21 connected to ground and the other terminal 12 connected to a load or high-voltage anode electrode of a cathode ray tube (not shown). One terminal 22 of the second stack comprised of capacitors C4, C5 is connected to the secondary of flyback transformer $T_2$. If the peak voltage of this transformer is 1 V, the voltage of all points along this stack oscillates over a range of approximately 2V. Charge is transported through the diodes and passes stepwise up through the condenser stacks to the output terminal 12.

Figure 2:
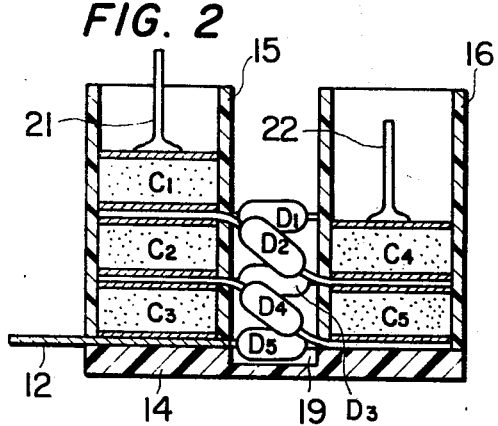
FIG. 2 is a cross-sectional view in elevation of an apparatus for fabricating the voltage multiplier circuit assembly block with condensers and diodes shown being placed in position in accordance with the invention.
Figure 3:
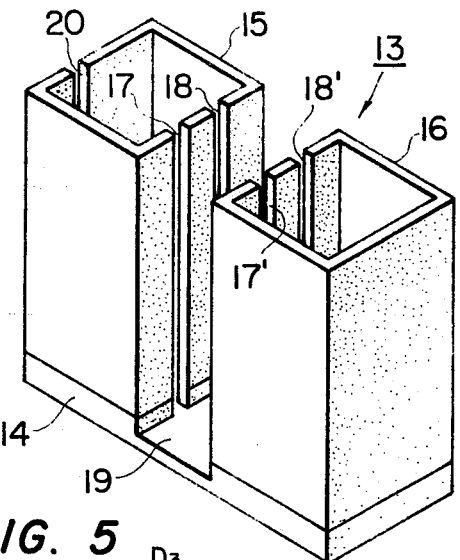
FIG. 3 is a perspective view of the apparatus of FIG. 3.
Figure 4:
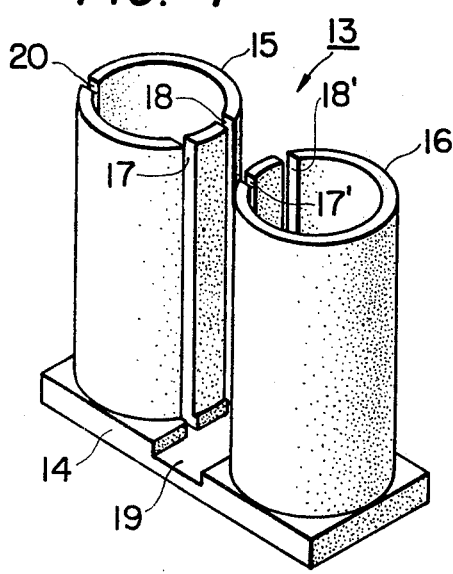
FIG. 4 is a perspective view of an alternative arrangement of the FIG. 3 embodiment.

The present invention contemplates the use of wafer type condensers or capacitors having a pair of opposed electrodes with a dielectric member sandwiched therebetween in conjunction with apparatus of FIGS. 3 and 4. In FIG. 3 apparatus 13 comprises an insulative support member 14, a pair of guide walls 15 and 16 juxtaposed thereon which may be rectangular in cross section to define first and second areas therein respectively. The guide wall 15 is provided with slits 17 and 18 and guide wall 16 with slit 17' and 18'. Slits 17 and 17' are arranged in opposed relation to each other and slits 18 and 18' are also arranged in opposed relation. The guide wall 15 defines with the guide wall 16 an intermediate area 19 between the first and second areas. The Cockcroft circuit 10 is constructed as follows: First by, one end of a connecting lead 12 is placed on the first area defined by the guide wall 15 through slit 20: second by, a diode $D_5$ is placed on the intermediate area 19 by passing its connecting leads attached to the opposite ends thereof through slits 18 and 18' so that the connecting leads extend into the first and second areas: thirdly, conductive cementing agent such as conductive adhesive (DOTITE A 101 manufactured by Fujikura Kasei Co., Ltd.) or creamy solder (Sparkle Print, Trade Mark of Senji Kinzoku Kogyo Co., Ltd.) is deposited on the first area; fourthly, a condenser $C_3$ is placed on the first area with one of its electrodes facing downward so that electrical contact is made between the connecting lead 12, one electrode of condenser $C_3$ and one of the connecting leads of the diode $D_5$; fifthly, a diode $D_4$ is placed on the intermediate area 19 with its connecting leads extending into the first and second areas through slits 17 and 17' so that one of its leads is in contact with the upper electrode of condenser $C_3$ and the other being in contact with the surface of insulative support 14; next, the cementing agent is deposited on the second area; and a condenser $C_5$ is placed on the second area so that electrical contact is made between the connecting leads of diodes $D_4$ and $D_5$ and the lower electrode of condenser $C_5$. These processes are repeated until condenser $C_1$ is placed on the upper surface of condenser $C_2$ placed on $C_3$. Finally, terminal electrodes 21 and 22 are cemented to the upper electrodes of condensers $C_1$ and $C_4$ (see FIG. 2).

If the creamy solder as described above is used, the circuit block is heated at a temperature of about 300° C so that contact points are fused to provide good electrical contact as well as a one-piece construction.

Figure 5:
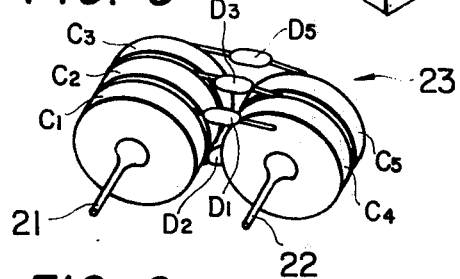
FIG. 5 is a perspective view of a voltage multiplier circuit assembly block made in accordance with the invention utilizing the apparatus of FIG. 4.
Figure 6:
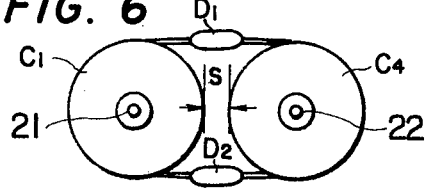
FIG. 6 is a plan view of the voltage multiplier circuit assembly useful for explanation of the advantage of the FIG. 4 apparatus.

In order to keep the overall size of an assembly of the voltage multiplier circuit 10 to a minimum, it is preferred to use the apparatus of FIG. 4 in which the guide walls 15 and 16 are cylindrical to accommodate two stacks of circular-shaped condensers. With this arrangement, diodes $D_1$ to $D_5$ are arranged on the opposite sides of the intermediate area 19 with the stacks of condensers being juxtaposed at a minimum spacing $s$ which is imposed by insulation requirements between adjacent condensers. The voltage multiplier circuit 10 as constructed in accordance with the invention is kept to a minimum size as shown in FIG. 5 which is encased within an insulative housing 24. The housing 24 is formed in conformity to the contour line of the circuit block 23 of FIG. 5 with a separating wall 25 and has one side thereof closed and the other side opened to permit the circuit block 23 to be introduced thereinto. The closed side wall has openings 26 and 27 to receive the terminals 21 and 22 therethrough. The housing 24 with the circuit block 23 being encased therein is placed within a second insulative housing 28 having opposing walls in pairs. On one of the side walls openings 29 and 30 are provided in positions conforming with the openings 26 and 27.

Alternatively, the rod-type terminal 21 may be replaced with a hook-type terminal 31 shown in FIG. 9 which is adapted to engage a notch 33 provided on the rim of a housing 32. The terminal 22 is first inserted into an opening 32a of the housing 32 and the circuit block 23 is rotated in a direction indicated by the arrow A so that the terminal 31 is brought into engagement with the notch 33 as shown in FIG. 10. The connecting lead 12 is then connected to insulated connecting lead 35 which is secured to the housing wall by a bushing 36 which engages a notch 34 provided on the rim of the housing 32. Molding material such as epoxy resin is introduced into the housing 32 and solidified as illustrated in FIG. 11. A cap type connector 38 is connected to the extreme end of the insulated wire 35 for connection to the anode of cathode ray tube. A lead 50 from the secondary winding of flyback transformer $T_2$ is provided with a connector pin 39 and a rubber tube 40 flared outwardly so that when the rubber tube 40 is pushed against the wall of the housing 32 the air inside the tube 40 is sucked to permit it to be secured to the wall. This ensures freedom from dust which may be a source of contact failure between the terminal 22 and the connecting pin 39.

However, cracks may occur in the molding material due to temperature variation and such cracks could result in poor insulation. To prevent the occurrence of cracks, it is necessary that the Cockcroft circuit is coated with a uniform layer of molding material. Alternatively, therefore, the Cockcroft circuit of FIG. 5 is placed in a mold having a configuration generally conforming to the contour lines of the circuit block of FIG. 5 such that the block may be coated with the molding material to a thickness of 2 to 3 mm. With the circuit block being placed in the mold, the mold is preheated at a temperature of 80° to 100° C for 15 to 30 minutes. Molding material such as epoxy resin, which has been agitated in a container to the extent that bubbles therein are sufficiently removed, is poured into the preheated mold. Next, the mold is heated to 80° to 90° C for 5 to 10 minutes and is placed in a vacuum chamber having a pressure level of 1 to 5 mm Hg and maintained there for a period of 10 to 5 minutes to remove bubbles present in the molding material. To cure the molding material, the mold is again heated at 100° C for 2 hours and at 120° C for another 2 hours. The circuit block of FIG. 5 is thus coated with a layer of epoxy resin to a thickness of 2 to 3 mm and taken out from the mold for after-cure treatment which is carried out at a temperature of 120° to 130° C for 15 hours. The Cockcroft circuit thus coated with a uniform layer of epoxy resin is free from cracks even if it is subjected to recycled temperature variations in the range between −40° C and 100° C.

We claim:

1. The method of fabricating a voltage multiplier assembly, comprising: stacking condensers, each comprised of a pair of opposed plate electrodes with a dielectric sandwiched therebetween, alternately on a first and second area with one of the electrodes facing downward so that the upper plate electrode of each condenser is in contact with the lower plate electrode of an adjacent condenser except for the uppermost condenser; placing one of a plurality of diodes having connecting leads to the opposite end thereof alternately with the stacking of each condenser on alternate third and fourth areas between said first and second areas with their connecting leads extending into said first and second areas such that the diodes are connected in a series circuit with each other with their respective leads between the electrodes of pairs of said stacked condensers and having relative polarities to define a direction of current flow; and applying conductive cementing agent to contact points between contacting electrodes of said stacked condensers and corresponding ones of the connecting leads of said diodes between said stacked condensers, thereby to form an integral voltage multiplier assembly consisting essentially of said stacked condensers, said diodes, and said cementing agent.

2. The method of fabricating a voltage multiplier assembly, comprising the steps of providing an insulative support and a pair of parallel vertical guide walls defining on said support first and second areas and an intermediate area therebetween, each of said guide walls having first and second vertical parallel guide slits in opposed relation to the corresponding vertical parallel guide slits of the other, placing condensers alternately in said first and second areas with one of their electrodes facing downward to form a pair of stacked condensers; placing diodes having connecting leads at the opposite ends alternately with said condensers on said intermediate area with their connecting leads extending into said first and second areas alternately through said first and second vertical slits of said walls such that the diodes are connected in series circuit with each other in the directon of a current flow; and applying conductive cementing agent to contact points between said condensers and diodes.

3. The method of claim 2, wherein said guide walls are cylindrical.

4. The method of fabricating a voltage multiplier assembly, comprising the steps of:
   a. providing an insulative support and a pair of parallel vertical guide walls defining on said support first and second areas and an intermediate area therebetween, each of said guide walls having first and second vertical parallel slits in opposed relation to the corresponding vertical parallel slits of the other,
   b. placing a lead containing diode on said intermediate area through said first vertical slit with its connecting leads extending into said first and second areas;
   c. depositing conductive cementing agent on said first area;
   d. placing a condenser having a pair of opposed electrodes on said first area with one of its electrodes facing downward;
   e. placing a lead containing diode on said intermediate area through said second vertical slit with its connecting leads extending into said first and second areas;
   f. depositing said conductive cementing agent on said second area;
   g. placing a condenser having a pair of opposed electrodes on said second area with one of its electrodes facing downward; and
   h. repeating the steps of (b) to (g) a number of times as necessary.

5. The method of fabricating a voltage multiplier assembly using an insulating support and a pair of parallel vertical guide walls defining on said support first and second areas and an intermediate area therebetween, each of said walls having first and second slits in opposed relation to the corresponding slits of the other, condensers of the type having a pair of opposed electrodes, and diodes each having a pair of connecting leads at the opposite ends thereof, which comprises the steps of:
   a. placing a diode on said intermediate area with its connecting leads extending into said first and second areas through the opposed first slits;
   b. depositing conductive cementing agent on said first area;
   c. placing a condenser on said first area with one of its electrodes facing downward;
   d. placing a diode on said intermediate area with its connecting leads extending into said first and second areas through the opposed second slits;
   e. depositing said conductive cementing agent on said second area;
   f. placing a condenser on said second area; and
   g. repeating the steps of (a) to (f) a number of times as necessary.

6. The method of claim 5 including the step of placing an electrode on said first area prior to the step of (a).

7. The method of claim 5, wherein said guide walls are cylindrical.

8. The method of claim 5, including the step of applying a uniform coating layer of moldable material to said voltage multiplier assembly after the step of (g).

9. The method of claim 8, wherein said step of applying a coating layer includes the steps of placing said voltage multiplier assembly in a mold having a configuration generally conforming to the contour lines of said voltage multiplier assembly, heating said mold, introducing said moldable material into said heated mold, heating said mold, placing said mold in a vacuum chamber for a predetermined period to remove bubbles present in said moldable material, heating said mold to cure said moldable material, and removing the cured material from said mold.

10. The method of claim 9, wherein said mold is heated after said cured material is removed from said mold for after-cure treatment.

11. The method of fabricating a voltage multiplier according to claim 5, wherein said pair of vertical guide walls are parallel and disposed so that the first and second areas defined by said guide walls on said support are substantially enclosed, and wherein said first and second slits in the respective guide walls extend from said support to ends of said respective guide walls opposite said support.

* * * * *